United States Patent [19]

Hawthorne

[11] Patent Number: 4,672,436

[45] Date of Patent: Jun. 9, 1987

[54] INTEGRATED CAMCORDER VIEWING AND SUPPORT SYSTEM

[76] Inventor: Louis Hawthorne, 203 Halton La., Watsonville, Calif. 95076

[21] Appl. No.: 826,384

[22] Filed: Feb. 5, 1986

[51] Int. Cl.⁴ .......................... H04N 7/18; H04N 5/225
[52] U.S. Cl. ......................................... 358/93; 358/229; 358/224; 352/243; 354/82; 354/199; 354/219; 354/223; 354/293
[58] Field of Search ...................... 358/88, 93, 94, 209, 358/210, 224, 225, 229, 230, 241; 354/82, 199, 219, 223, 293; 352/243

[56] References Cited

U.S. PATENT DOCUMENTS

| | | |
|---|---|---|
| 3,059,519 | 10/1962 | Stanton . |
| 3,170,979 | 2/1965 | Baldwin et al. . |
| 3,788,585 | 1/1974 | Masseron ............................. 354/293 |
| 3,919,475 | 11/1975 | Dukich et al. ...................... 358/229 |
| 3,923,370 | 12/1975 | Mostrom .............................. 350/55 |
| 4,017,168 | 4/1977 | Brown ................................. 354/82 |
| 4,153,913 | 5/1979 | Swift ................................... 350/174 |
| 4,158,490 | 6/1979 | Gottschalk et al. ................ 352/243 |
| 4,398,799 | 8/1983 | Swift ................................... 350/174 |
| 4,415,250 | 12/1983 | Rossmann et al. .................. 354/82 |
| 4,516,157 | 5/1985 | Campbell ............................ 358/229 |
| 4,541,698 | 9/1985 | Lerner ................................. 354/219 |

OTHER PUBLICATIONS

High Technology; "Camcorders: Home Movies Made Simple" by Mark Schubin; Oct. 1985, pp. 16-20.

Primary Examiner—James J. Groody
Assistant Examiner—Michael D. Parker
Attorney, Agent, or Firm—Richard C. Woodbridge

[57] ABSTRACT

A camcorder is equipped with a head mounted viewfinder that is visible to only one eye of the camera operator. The viewfinder is mounted on an adjustable head support and positioned directly in front of one eye of the camera operator so that the camera operator sees the recorded scene viewed by the video camera with the eye and is free to view the remaining surroundings with the other eye. A counter-balanced staff supports the camcorder in such a way that the staff and camcorder can be held in one hand. The single eye viewfinder arrangement cooperates with the counter balanced camera support staff to maximize the efficiency and effectiveness of the television camera operator and to minimize undesirable side effects such as camera wobble.

17 Claims, 25 Drawing Figures

INTEGRATED CAMCORDER VIEWING AND SUPPORT SYSTEM

BACKGROUND OF THE INVENTION

1. Field of the Invention

The invention relates to a system for supporting a video camera or camcorder on a staff and viewing the recorded scene through a single viewfinder mounted adjacent to one eye of the camera operator.

2. Description of the Prior Art

The advent of small hand holdable video camera/videotape recorder combinations known as "camcorders" has made it possible to efficiently and inexpensively videotape activities at locations where bulky prior art video equipment couldn't go. A useful description of the state-of-the-art camcorders can be found in the October 1985 edition of HIGH TECHNOLOGY, pages 16–20. Camcorders are generally characterized by self-contained camera optics and camera/recorder electronics in a single small portable unit. Camcorders are constructed primarily for the consumer market and therefore mimic the size and structure of prior art hand-held movie cameras such as the well-known Super-8 camera, as well as conventional video cameras. However, when said cameras are employed for the purpose of recording dynamic events they present certain problems. First of all, it is difficult for the camera operator to move his body with a camera resting on his shoulder. Secondly, it is hard to change camera height when shooting with a shoulder supported unit. Thirdly, it is difficult to move a camera out of the vertical plane smoothly with a prior art hand-held camera. What is needed is a system for efficient use of the eye piece separate from the camera, integrated with a means for easy holding and manipulation of the camcorder itself. It is believed that at least one prior art camcorder has a separable viewfinder, however, there appears to be no relevant teaching or suggestion of efficiently using the separable viewfinder in the context of a system that could be used to cover a typical event.

The prior art also discloses a number of pilot training devices in which electro-optical instrumentation is attached to the pilot's helmet. Note for example, U.S. Pat. No. 3,059,512 entitled HEAD GEAR MOUNTED CATHODE RAY TUBE AND BINOCULAR VIEWING DEVICE. A cathode ray tube is described in that patent as being mounted inside the pilot's head gear, visible through an optical system of lenses and mirrors. A number of other flight simulation devices generally known as "Heads-Up Displays" are described in the text of the following U.S. Pat. Nos: 3,923,370; 4,398,799 and 4,153,913. Typically such devices display an image to both eyes of the pilot.

The prior art also discloses devices in which television cameras are mounted on the head of the user. See, for example, U.S. Pat. No. 3,919,475 entitled HEAD ATTACHED TELEVISION which describes a system in which a head mounted television camera is used to track items viewed by the user.

Lastly, of some possible relevance is U.S. Pat. No. 3,170,979 which discloses an OPTICAL IMAGE INTERPOSING DISPLAY DEVICE for imposing an image via a CRT on a half-silvered mirror.

Insofar as understood none of the prior art describes, teaches or suggests the system of the present invention.

SUMMARY OF THE INVENTION

Briefly described the invention comprises an integrated camcorder system which permits a camera operator to videotape an event efficiently and effectively. The system incorporates two basic components, namely a headmounted viewfinder and a camcorder support staff. The head mounted viewfinder positions a CRT so that it is located directly in front of one of the eyes of the camera operator. A counterweight is located 180° opposite from the CRT to reduce operator neck strain. The viewfinder mounting bracket is adjustable in several modes so as to optimally position the eye piece. When the viewfinder is correctly positioned the camera operator will see the view recorded by the camcorder through one eye and will see normally through the other.

The camcorder is preferably mounted to the front end of a support staff. An adjustable counterweight system located in the rear of the staff counter-balances the weight of the camcorder. The midsection of the staff is equipped with a hand grip which is always held in one hand or the other of the camera operator. The axis of the lens of the camcorder is aligned to coincide substantially with the long axis of the shaft. Adjustments to the counterweight make it possible to compensate for both the top-heavy and left-heavy weight distribution of the average camcorder following said axial alignment. By counter-balancing the staff with a slight bottom-heavy bias it is possible to ascertain true vertical orientation by "feel" alone without concentrating on horizon lines as seen in the viewfinder. The center of gravity of the staff for both pitch and roll is located at the hand grip so that the camera can be manipulated easily with one hand. The free hand can be used either to change the focusing and related controls on the camcorder in the front of the staff, or may be used to grab a hand grip wheel mounted on the rear of the staff permitting the camera operator to easily rotate the camcorder to angles which would be a awkward or impossible with prior art cameras. The viewfinder head set unit and the camcorder staff support unit operate synergistically to create a professional recording. The additional mass and precise balance provided by the camcorder support staff minimizes and damps image instability resulting from camcorder movement.

The viewfinder head set unit is preferably connected to the camcorder support staff through a cable that attaches to a socket at the rear of the staff. According to an alternative embodiment of the invention, the viewfinder head-set and the camcorder support staff unit can be respectively equipped with miniaturized radio receiver/transmitter units which permit communication between the two units without wires. This increases the flexibility of the system by eliminating problems associated with the connecting cable such as entanglement and restricted mobility.

These and other features of the invention will be more fully appreciated by reference to the following drawings.

DETAILED DESCRIPTION OF THE INVENTION

During the course of this description the same numbers will be used to describe like elements according to the different figures which illustrate the invention.

Figure 1:
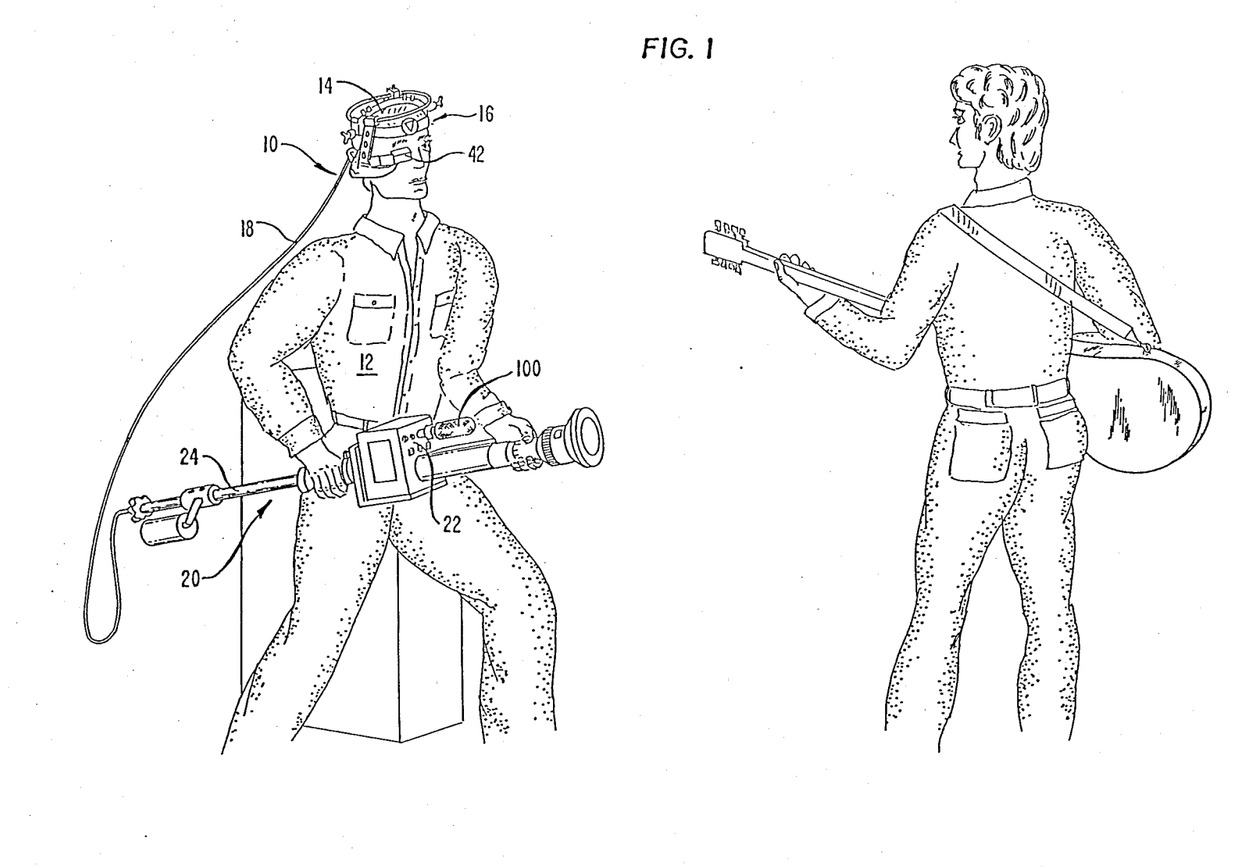
FIG. 1 is a perspective view of the preferred embodiment of the invention employed in the context of a musical event being tape recorded by a camera operator.

The preferred embodiment of the invention 10 is illustrated in FIG. 1 in the context of an event being videotaped by a cameraman 12. A viewfinder head set unit 16 is shown located on top of the cameraman's head 14. One of the cameraman's eyes is positioned to look directly into the viewfinder while the other eye is free to view the activities in the normal fashion. A cable 18 connects the head set unit 16 to a camcorder staff support unit 20. Camcorder staff support unit 20 includes a removable camcorder 22 and the support staff section 24. One of the cameraman's hands is shown holding the grip 74 while the other hand is shown manipulating the lens control of the camcorder 22. The camcorder staff support unit is balanced so that only one of the cameraman's hands is needed to support the camcorder 22 without wobble. The other hand can be used either to adjust the controls of the camcorder 22 or to grip the rear hand wheel 86 or to perform other necessary functions with the free hand.

FIGS. 2A-2G illustrate the details of the view finder head set unit 16. A head band section 26 directly contacts the head 14 of the camera operator 12 and provides a platform for supporting a mounting ring or halo 36, view finder support mounting bracket 50, viewfinder 42 and counterweight unit 44. Head band section 26 includes a horizontal band 28 which goes around the periphery of the head 14 and a vertical band 32 which goes over the top of the head 14. Tightening knob 30 located in the rear of the horizontal band is employed to adjust the tightness of the horizontal section. Similarly vertical band 32 includes a set of tightening studs and notches 34 to adjust the vertical tension of the head band section 26.

Mounting ring 36 is connected by swivel brackets 38 to the head band support 26. Wing nuts 40 are used to lock down swivel brackets 38, after adjusting the tilt of the mounting ring 36. A group of adjustment holes 46 are preferably located in the left rear section of mounting ring 36 and are adapted to receive a threaded stud at the top of counterweight 44. Nut 48 is threaded to engage the stud and lock counterweight 44 in position. Counterweight 44 can be positioned in any one of the adjustment holes 46 so as to precisely counter-balance the weight of the viewfinder 42.

Figure 2A:
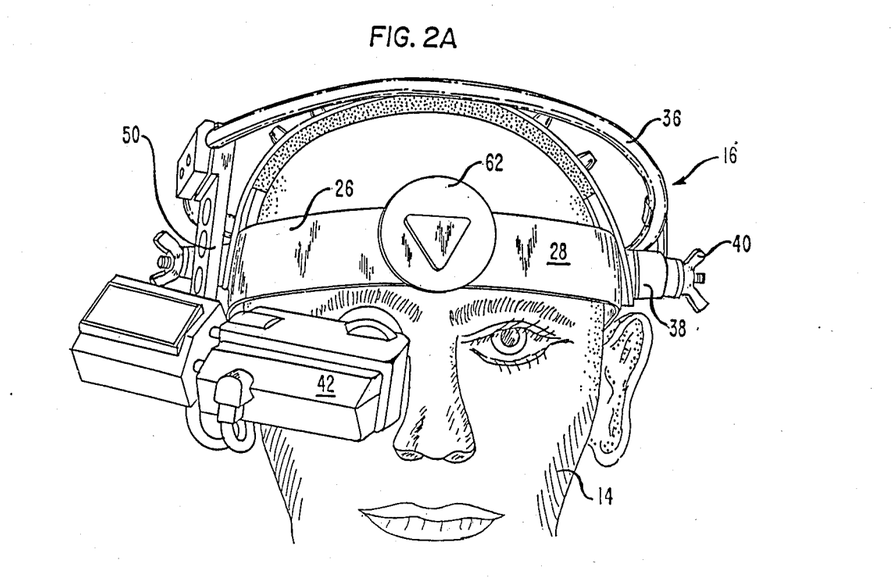
FIG. 2A is a front view of the viewfinder head set unit according to the preferred embodiment of the invention.
Figure 2B:
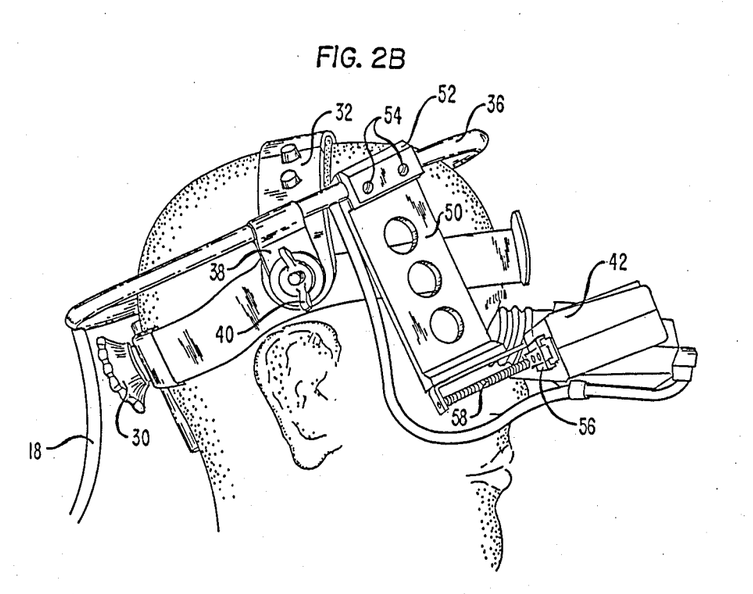
FIG. 2B is a right side view of the head set unit illustrated in FIG. 2A.
Figure 2C:
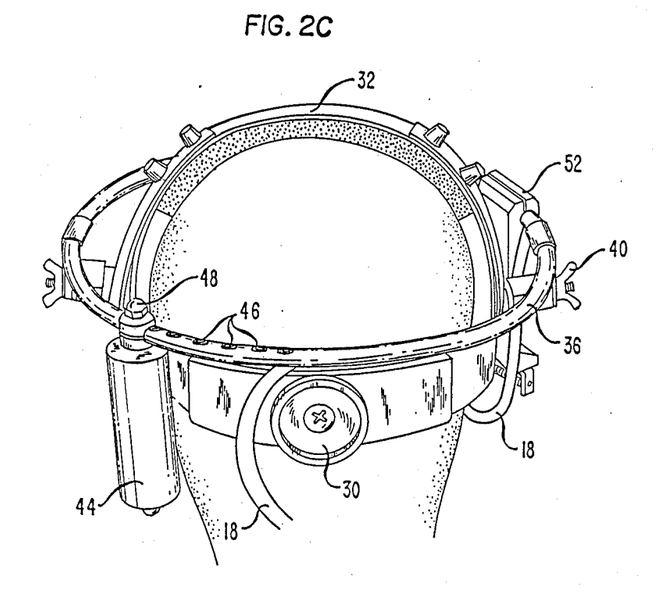
FIG. 2C is a rear view of the head set unit illustrated in FIG. 2A.
Figure 2D:
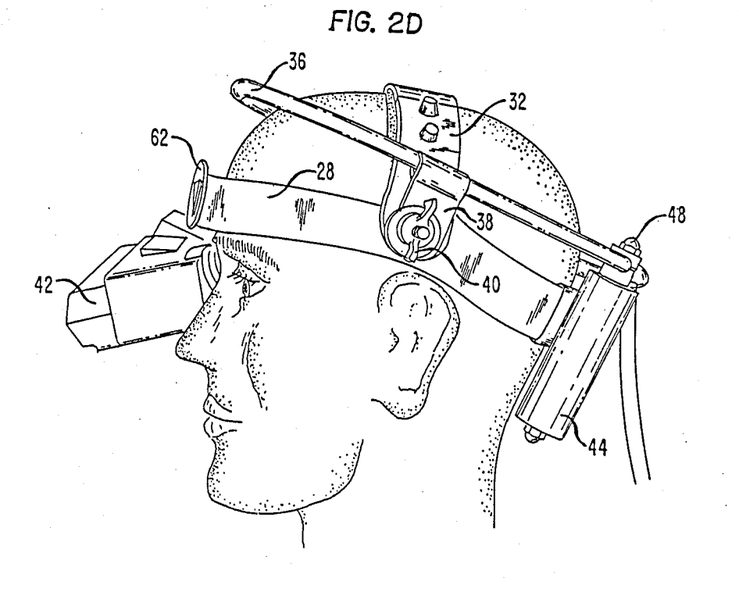
FIG. 2D is a left side elevational view of the head set unit illustrated in FIG. 2A.
Figure 2E:
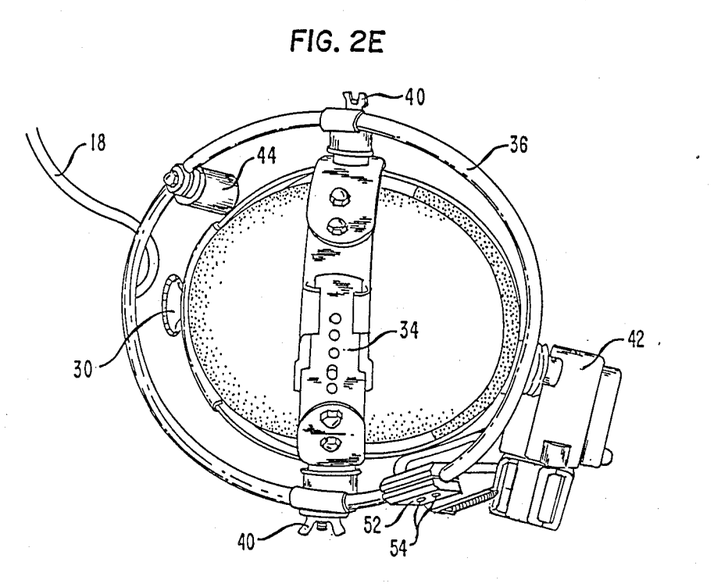
FIG. 2E is a top plan view of the head set unit illustrated in FIG. 2A.
Figure 2F:
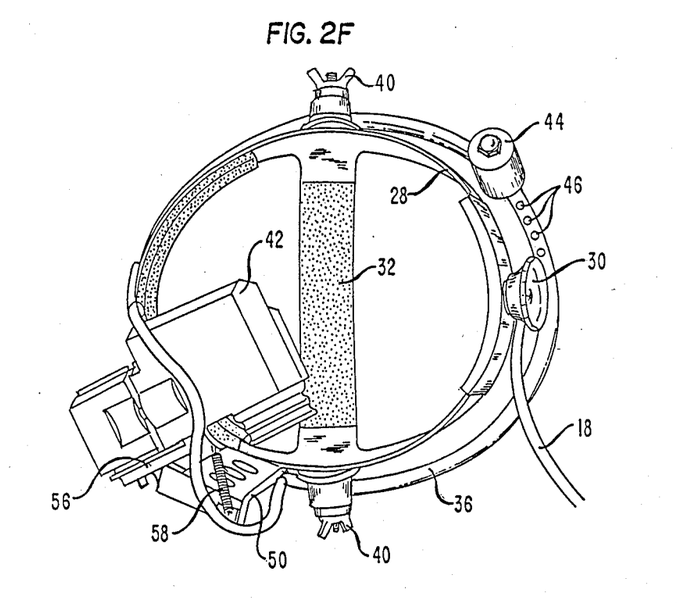
FIG. 2F is a bottom view of the head set unit illustrated in FIG. 2A.
Figure 2G:
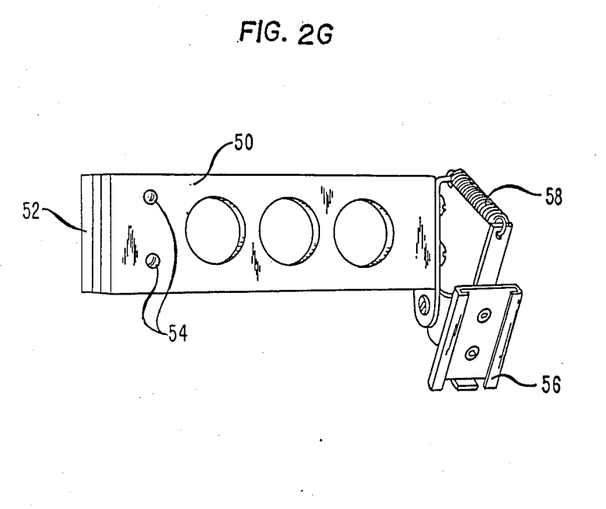
FIG. 2G is a detail of the viewfinder mounting bracket and spring loaded mechanism employed in the embodiments illustrated in FIGS. 2A-2F.

Viewfinder 42 is attached by mounting bracket 50 to mounting ring 36. A two piece vice section 52 which forms the top of the viewfinder mounting bracket 50 grips the edge of mounting ring 36. A pair of set screws 54 in vice section 52 permit the bracket to be selectively positioned and locked anywhere along the right front quadrant of mounting ring 36. A viewfinder mounting plate 56 is attached to the bottom portion of mounting bracket 50. Viewfinder 42 includes a pair of grooves that naturally engage mounting plate 56. Spring 58 attached to mounting bracket 50 and the viewfinder mounting plate 52 urges the viewfinder 42 gently against the eye of the camera operator 12. A decorative triangle 62 composed of the mineral Tiger-Eye is located in the front portion of the horizontal band 28 and serves to identify the product.

The camcorder staff support unit 20 according to the preferred embodiment is illustrated in detail in FIGS. 3A-3G. Each staff support unit 20 includes a front section 64, a middle or central section 66 and a rear section 68.

Figure 3A:
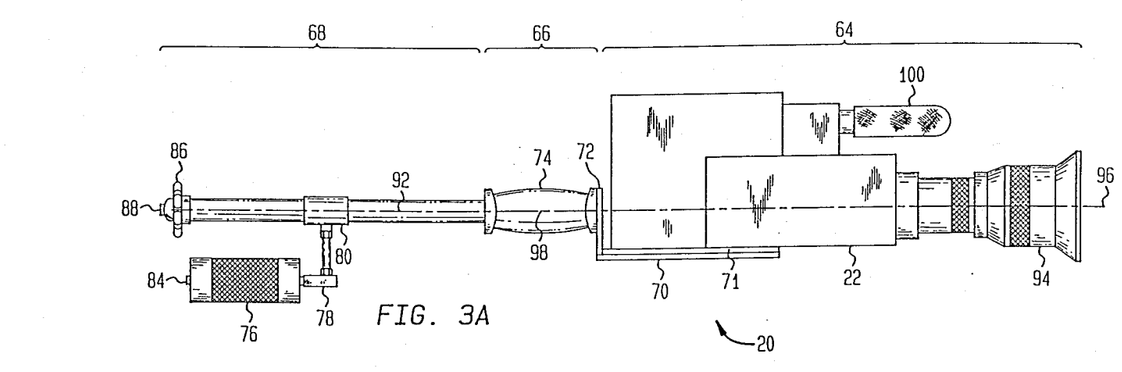
FIG. 3A is a side elevational view of the preferred embodiment of the camcorder staff support unit shown supporting a camcorder.
Figure 3B:
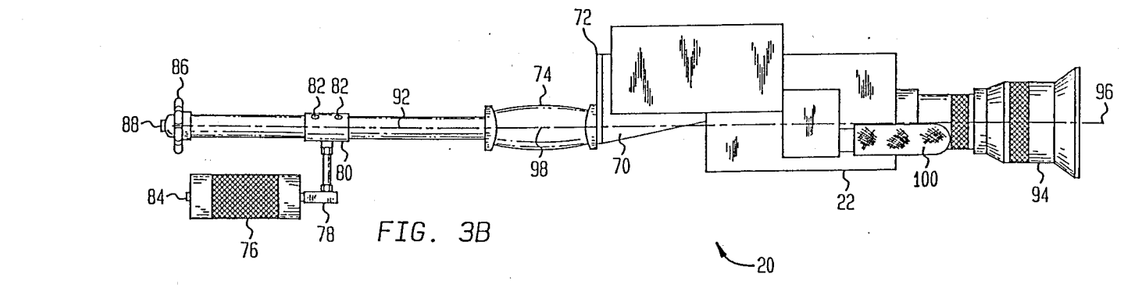
FIG. 3B is a top plan view of the camcorder support staff unit illustrated in FIG. 3A.
Figures 3C, 3G:
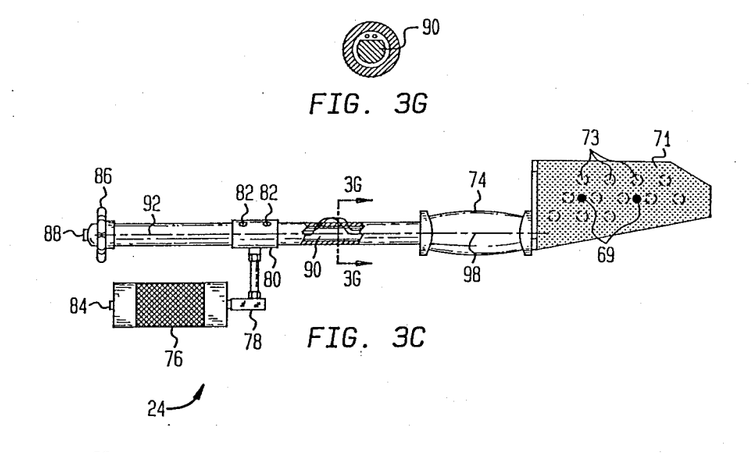
FIG. 3C is a top plan view of the camcorder support staff unit illustrated in FIG. 3B shown with the camcorder removed.
FIG. 3G is a cross sectional view of the camcorder support staff illustrated at 3G in FIG. 3C.
Figure 3D:
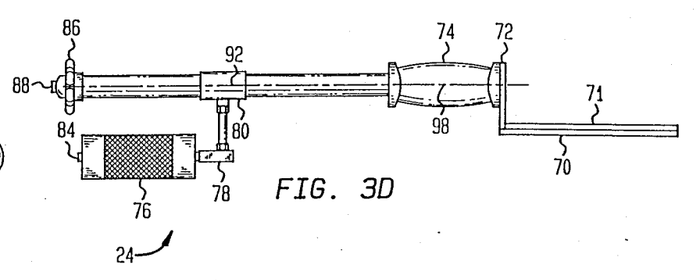
FIG. 3D is a side elevational view of the camcorder support staff unit as shown in FIG. 3A with the camcorder removed.

Front section 64 includes a horizontal camcorder support plate 70 a rubberized pad 71 and a butt plate 72. Camcorder 22 sits on pad 71 on support plate 70 and its rear section rests against butt plate 72. A set of holes 69 in support plate 70 permit the camcorder 22 to be fastened to plate 70 by a variety of conventional means. Additional larger holes 73 can be added for weight reduction. Middle shaft section 66 includes a resilient hand grip 74 adapted to be grasped by one hand of the camera operator 12. The center of gravity of the camcorder shaft support unit 20, when fully loaded with camcorder 22 passes roughly through the central portion of hand grip 74. Lastly, rear shaft section 68 includes an eccentrically mounted counterweight 76 which is positioned to counter-balance the weight of camcorder 22. Counterweight 76 is preferably formed from machined steel and is attached to rear shaft section 68 by 90° elbow 78. A split sleeve 80 surrounds the rear shaft 68 and may be set in position by a pair of set screws 82. Counterweight 76 includes a threaded core which mates with threads on shaft 84. It is possible to roughly adjust the location of the counterweight 76 through the use of set screws 82. Finer positional adjustment may then be obtained by rotating counterweight 76 and adjusting its position along threaded shaft 84. A rear hand wheel 86 is attached to the butt of rear section 68. Cable 18 from the head set unit 16 is attachable to socket 88 in the enter of hand grip wheel 86. A 6 inch steel cylindrical insert 90 shown in FIGS. 3C and 3G is also located inside the rear shaft section 68 and provides additional counterweighting for camcorder 22.

A useful feature of the invention 10 is the fact that the long axis 92 of the support shaft 24 directly coincides with the central axis 96 of the lens 94 of camcorder 22. Both axes 92 and 96 pass through the center of gravity 98 located in the hand grip section 74. With the camcorder 22 balanced in this manner it only takes a small amount of hand effort exerted on the hand grip 74 to rotate the camcorder 22 in any given direction. The additional masses 76 and 90 further damp vibrations and involuntary human hand movements that otherwise might jiggle the camcorder 22. According to the preferred embodiment 10 the camcorder 22 includes a microphone 100 and controls on the chassis of camcorder 22 that can be manipulated with the free hand of the camera operator 12.

In operation the system according to the preferred embodiment of the invention is set up in the following fashion.

First, the horizontal band 28 and the vertical band 32 are adjusted by tightening mechanisms 30 and 34 respectively.

Second, the view finder 42 has to be positioned with respect to the eye of the camera operator 12. Viewfinder 42 can be positioned in three planes as follows:

(a) Y axis

View finder 42 can be adjusted in the Y axis by loosening wing nuts 40 and tilting mounting ring 36 up or down.

(b) X axis

View finder 42 can be adjusted in the X axis by loosening vice set screws 54 and moving bracket 50 along the periphery of mounting ring 36 and/or by moving the lower end of bracket 50 in and out so that it assumes a different angle with respect to the plane of ring 36.

(c) Z axis

Adjustment of viewfinder 42 along the Z axis is accomplished semi-automatically by spring 58 which exerts a gentle pressure on viewfinder 42 urging it into position against the eye of camera operator 12.

When correctly mounted the viewfinder 42 should completely cover the right or left eye of the camera operator 12, leaving the other eye completely free to observe the normal scene. This gives the camera operator distinctly separate images entering the right and left eye.

Third, counterweight 76 is adjusted to balance the weight of camcorder 22 on the front section 64 of staff 24. The counter-balancing of camcorder 22 takes place in two steps. In the first step the set screws 82 are loosened and the supporting 90° elbow 78 is manipulated to roughly counter-balance camcorder 22. Since camcorder 22 is lopsided (i.e. eccentrically weighted) it is important that counterweight 76 be located sufficiently far enough out to the side of staff 24 to counter-balance the eccentric center of gravity of camcorder 22 located on the other side of staff 24. This is accomplished by the angular adjustment of set screws 82. Counterweight 76 is also positioned along the long axis of the rear section 68 of staff 24 so as to place the center of gravity 98 of the whole unit in the hand grip section 74. As a second step to fine tune the counter-balance procedure, counterweight 76 is rotated on threaded shaft 84 so as to place it in the precise optimum counter-balance location. Ideally when the angular and longitudinal adjustments of counterweight 76 are complete, the center of gravity 98 of the invention 10 will be located near the center of hand grip 74. Moreover, shaft axis 92 and lens axis 96 should pass through center of gravity 98. The shaft support unit 24 is adjusted to be slightly bottom heavy so that the camcorder 22 tends towards an upright position when held in the hand of a camera operator 12. The counterbalancing operation of this third step is ideally performed once and does not have to be performed again unless a differently weighted camcorder is used.

Figure 3E:
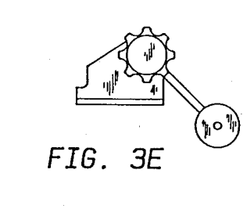
FIG. 3E is a rear elevational view of the camcorder support staff unit illustrated in FIG. 3D.
Figure 3F:
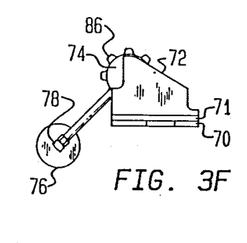
FIG. 3F is a front elevational view of the camcorder support staff unit illustrated in FIG. 3D.
Figures 4A, 4B, 4C, 4D, 4F, 4G:
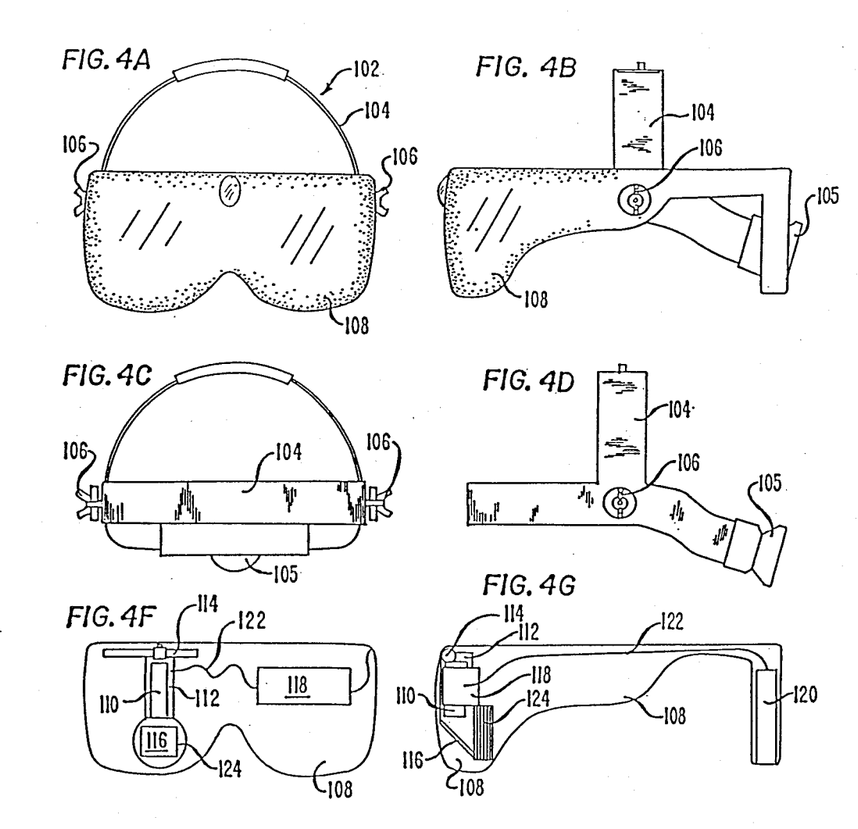
FIG. 4A is a front elevational view of an alternative embodiment of the head set portion of the present invention employing wireless communication between the viewfinder head set unit and the camcorder staff support unit.
FIG. 4B is a left side elevational view of the head set unit illustrated in FIG. 4A.
FIG. 4C is a front elevational view of the head set unit as shown in FIG. 4A with the visor removed.
FIG. 4D is a left side elevational view of the head set unit illustrated in FIG. 4B with the visor section removed.
FIG. 4F is a front elevational view of the head set unit showing the location of the viewfinder and associated electronic components.
FIG. 4G is a left side cutaway view of the head set showing the location of the viewfinder and the associated electronic components.
Figure 4E:
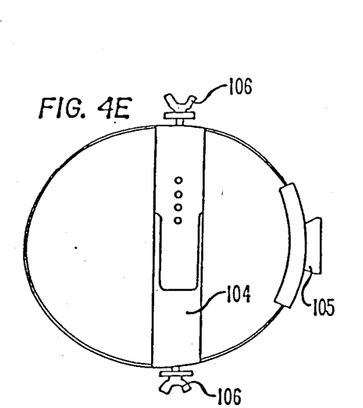
FIG. 4E is a top plan view of the head set unit illustrated in FIGS. 4C and 4D with the visor removed.
Figure 4H:
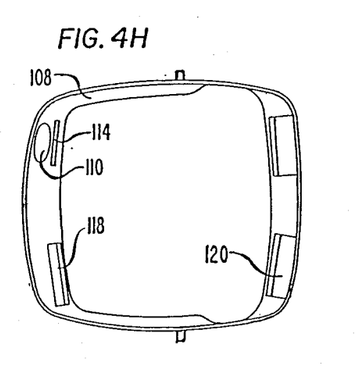
FIG. 4H is a top plan view of the head set showing the location of the viewfinder and the associated electronic modular components.

Fourth, cable 18 is connected to socket 88 in rear hand grip wheel 86.

Once the equipment has been set up as previously described and the camcorder 22 is turned on it can be used in a variety of ways. The most common technique is to hold the hand grip 74 in the right hand while using the left hand to adjust the controls on camcorder 22. When used in this manner the invention 10 is typically held at hip height as shown in FIG. 1. However, it can be held at any height from ground level to fully extended over the head with smooth movement possible between both positions. When held overhead the entire unit can be supported with just one hand on the hand grip 74. If more support is necessary the unit 20 can also be supported by placing the remaining free hand on wheel 86. There is a functional relationship between the head set unit 16 and the camcorder staff support unit 20. If something important happens outside of the field of view of lens 94 the camera operator 12 can rotate his head 14 while maintaining camera position and monitor an extended field of view with his or her unobstructed eye. This makes the camera operator 12 much more efficient and effective in the performance of his duty. Moreover, given the unique counter-balancing ability of the camcorder staff support unit 20, it is possible to achieve camera effects normally associated with expensive and cumbersome gyroscopic and/or hydraulic cameras.

An alternative wireless embodiment 102 is illustrated in FIGS. 4A–4H and 5A and 5B. A head support 104 is attached to a visor 108 by a wing nut and swivel combination 106. A tension adjustment knob 105 in the back of head band 104 permits the circumference to be adjusted to the head 14 of the wearer. A similar stud and hole adjustment is located on the top of the head support. The visor 108 supports substantially all of the electronics and counterweights associated with the viewfinder. A cathode ray tube (CRT) 110 is mounted on bracket 112 which in turn is supported by rod 114. A mirror 116 located below CRT 110 directs the view through eye piece 124 to the right eye of the camera operator. A high voltage electronic module 118 is located above the left eye of the camera operator out of his field of view. The weight of the CRT 110 and the electronic module 118 is balanced by counterweight 120. Counterweight 120 incorporates a radio receiver, batteries and antenna as well as additional dead weight, if necessary. CRT 110 and electronic module 118 are connected to the video receiver and antenna 120 by cable 122. Counterweight unit 120 can be adjustably located to obtain the maximum balance in the same manner that counterweight 44 can be adjusted to balance head unit 16 of the preferred embodiment 10.

Figure 5A:
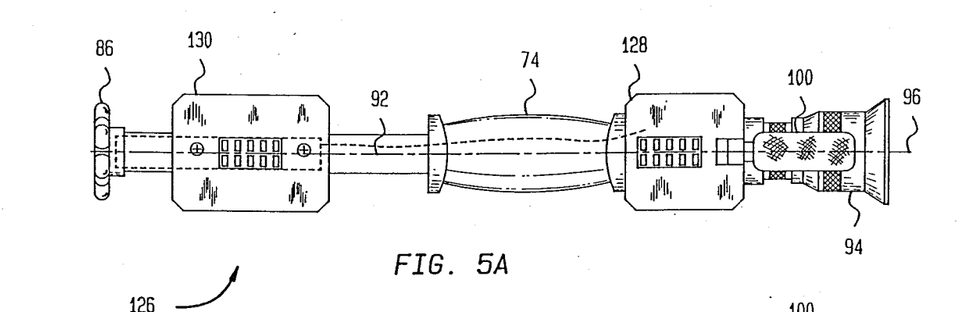
FIG. 5A is a side elevational view of the alternative embodiment of the invention incorporating wireless communication between the head set unit and the camcorder staff support unit.
Figure 5B:
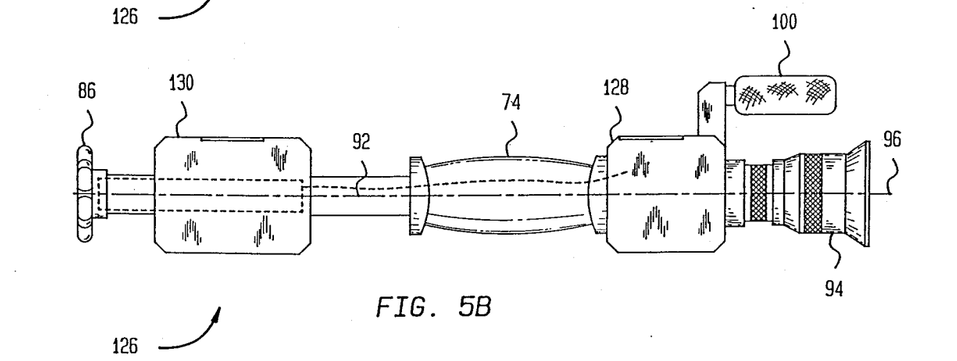
FIG. 5B is a top plan view of the alternative embodiment illustrated in FIG. 5A.

The support staff unit 126 according to the alternative embodiment is illustrated in FIGS. 5A and 5B. Video camera 128 is balanced by transmitter section 130. Because video camera 128 is relatively symmetrical it is not necessary to balance it with any eccentrically mounted external weights. Counter-balance transmitter unit 130 incorporates a broadcast-quality video-transmitter and antenna as well as the associated transmitter controls. Like the preferred embodiment 10, the alternative embodiment 126 is aligned so that the staff axis 92 coincides with the axis 96 of lens 94. The advantage of the alternative embodiments 102 and 126 is that the camera operator 12 has more freedom because the head set unit 102 and the staff support unit 126 are not connected together by a cable 18. This is especially useful in close quarters where it might be possible to snag a cable.

Another advantage of the alternative embodiment 126 of the invention over the prior art is ruggedness. There are three delicate elements in conventional prior art camera systems: The video heads (more delicate in camcorders than full size separate VCR's), the camera tube, and the lens. The alternative embodiment 126 will preferably employ a broadcast quality camera using charge-coupled devices (CCD chips) which are much more rugged than conventional camera tubes. Because the alternative embodiment broadcasts to a VCR instead of integrating it with the camera 126, the alternative embodiment 126 has no moving or delicate parts except the lens.

There are certain modifications that are possible given the foregoing basic description. According to the preferred embodiment of the invention the camcorder 22 might comprise a JVC model GR-ClU. However, other models of camcorders could also be useable. It may also be possible to use other counterweight configurations, even though the design described appears to give the best results.

While the invention has been disclosed with reference to the preferred embodiment thereof, it will be understood by those of ordinary skill in the art that various changes can be made to the structure and location of the components without departing from the spirit and scope of the invention.

I claim:
1. A video camera viewing and support system for use by a camera operator comprising:
a video camera means;
single eye viewer means for viewing the scene recorded by said camera means;
communicating means for communicating said single eye viewer means with said camera means;
head support means for supporting said single eye viewer means on the head of the camera operator, said head support means including head contacting means and mounting means connected to said head contacting means for supporting said single eye viewer means; and,
first counterweight means connected to said mounting means for balancing the weight of said single eye viewer means,
wherein the camera operator can view the scene recorded by the camera means through one and only one eye.
2. The system of claim 1 further comprising:
staff means for supporting said camera means.
3. The system of claim 2 wherein said staff means further comprises:
a front section for mounting said camera means;
a central section connected to said front section; and,
a rear section including a second conterweight means for balancing the weight of said camera means.
4. The system of claim 3 further including:
hand grip means connected to said central section to permit said staff means to be held by said camera operator.
5. The system of claim 4 wherein said staff means has a longitudinal axis that substantially passes through the long optical axis of the lens of said camera means.
6. The system of claim 5 wherein said second counterweight means is adjustable so that the center of gravity of said staff means passes substantially through said hand grip means.
7. The system of claim 6 wherein said staff staff means includes:
first adjustment means for adjusting the longitudinal and angular position of said second counterweight means.
8. The system of claim 7 wherein said staff means further includes:
second adjustments for finely adjusting the longitudinal position of said second counterweight means.
9. The system of claim 8 wherein said mounting means attached to said head contacting means comprises:
an annual ring; and,
an adjustable attachment means for connecting said annular ring to said head contacting means.
10. The system of claim 9 wherein said means for communicating said single eye viewer means to said video camera means comprises a wire means.
11. The system of claim 3 wherein said communicating means comprises a first radio transmitter and receiver means connected to said single eye viewer means; and,
a second radio transmitter and receiver means mounted on said staff means for communicating with said first radio trasmitter and receiver means.
12. The system of claim 11 further including:
visor means attached to said head contacting means, said visor means supporting said first radio transmitter and receiver means and said single eye viewer means.
13. The system of claim 1 further including:
adjustable bracket means attached to said mounting means and to said single eye viewer means for adjusting the position of said single eye viewer means with respect to the eye of the camera operator.

14. A video camera support system comprising:
a video camera means;
staff means for supporting said camera means, said staff means including a front staff section for mounting said camera means, a central staff section connected to said front staff section, and a rear staff section including counterweight means for balancing the weight of said camera means,
hand grip means connected to said central staff section to permit said staff means to be held by one hand of said camera operator,
wherein said staff means has a longitudinal axis that substantially coincides with and is substantially parallel to the long optical axis of the lens of said camera means.

15. The system of claim 14 wherein said staff counterweight means is adjustable so that the center of gravity of said staff means passes substantially through said hand grip means.

16. The system of claim 15 wherein said staff means includes:
first adjustment means for adjusting the longitudinal and angular position of said counterweight means.

17. The system of claim 16 wherein said staff means further includes:
second adjustment means for finely adjusting the longitudinal position of said counterweight means.

* * * * *